United States Patent [19]
Hausch et al.

[11] 3,916,072
[45] Oct. 28, 1975

[54] LAMINATES WITH ADHESIVES CONTAINING ALIPHATIC NITRO COMPOUNDS

[75] Inventors: Walter R. Hausch; John W. Fieldhouse; Edward L. Kay, all of Akron, Ohio

[73] Assignee: The Firestone Tire & Rubber Company, Akron, Ohio

[22] Filed: Oct. 15, 1974

[21] Appl. No.: 514,343

Related U.S. Application Data

[62] Division of Ser. No. 383,733, July 30, 1973, Pat. No. 3,880,808.

[52] U.S. Cl. ............ 428/423; 156/110 A; 156/331; 428/424; 428/480; 428/506; 428/519; 428/521; 260/77.5 R
[51] Int. Cl.$^2$ ........................................ B32B 27/40
[58] Field of Search............ 260/77.5 R; 156/110 A, 156/128 U, 331; 161/190, 247

[56] References Cited
UNITED STATES PATENTS
3,503,845   3/1970   Hollatz et al. ...................... 161/190

*Primary Examiner*—George F. Lesmes
*Assistant Examiner*—R. J. Roche

[57] ABSTRACT

Adhesive compositions containing aliphatic nitro compounds.

5 Claims, No Drawings

LAMINATES WITH ADHESIVES CONTAINING ALIPHATIC NITRO COMPOUNDS

This is a division of application Ser. No. 383,733, filed July 30, 1973, now U.S. Pat. No. 3,880,808.

FIELD OF THE INVENTION

This invention relates to obtaining improved adhesion between polyurethane rubbers and olefinic rubbers or other substrates including metals. By polyurethane rubbers are meant the rubbers produced by reaction of relatively high molecular weight polyester or polyether resins with polyisocyanates. By olefinic rubbers are meant those rubbers containing olefinic unsaturation in their polymer chains such as natural rubber, synthetic polyisoprene (IR), polybutadiene (BR), rubbery copolymers of butadiene and styrene (SBR), rubbery copolymers of butadiene and acrylonitrile (NBR), rubbery copolymers of isoprene and isobutylene (IIR), polychloroprene (CR), ethylene-propylene rubbers (EPDM) and the like. This invention has particular use in applications where strength of a high degree is important as in production of tires, belting, industrial rubber articles and like products composed of both polyurethane rubber and olefinic rubber components.

PRIOR ART

It is known from U.S. Pat. No. 2,905,582 that bonding of a polyurethane rubber to an olefinic rubber can be realized by interposing between such rubbers an adhesive including in combination an organic isocyanate and an aromatic compound containing at least one nitroso group attached directly to a ring carbon atom. The aromatic nitroso compounds contemplated by this patent are those wherein one or more of the molecular hydrogens of the aromatic nucleus is replaced by alkyl, alkoxy, cycloalkyl, aryl, arylalkyl, arylamine, arylnitrosoamine, halogen and like groups. This patent suggests that its adhesive compositions contain in addition to the described aromatic nitroso compounds and isocyanates also a so-called organic film-forming material such as a natural or synthetic elastomer or resin and it is further contemplated by the patent that tires be produced by adhering a polyurethane rubber tread to an olefinic rubber body.

SUMMARY OF THE INVENTION

While this invention also relates to adhesive compositions comprising an organic isocyanate and often for best results an organic film-forming material, the adhesives compositions of this invention contain also an aliphatic nitro compound as an adhesion promoter. To applicant's knowledge aliphatic nitro compounds have not heretofore been employed as adhesion promoters. Aliphatic nitro compounds employed in this invention are illustrated by the following generalized formula:

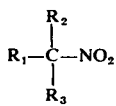

wherein $R_1$, $R_2$ and $R_3$ are selected from the group consisting of hydrogen atoms, hydrocarbyl groups and halogen atoms. $R_1$, $R_2$ and $R_3$ may be the same or different; that is any combination of hydrogen atom, hydrocarbyl group, and halogen atoms are suitable.

The hydrocarbyl group may contain from one to about 16 carbon atoms arranged in a straight or branched chain configuration. The chain may be saturated or unsaturated. The hydrocarbyl group may be a cyclic or an aromatic structure or any combination of these structures. The hydrocarbyl groups may also contain halogen atoms, preferably chlorine or bromine atoms. The hydrocarbyl groupds may also contain functional groups such as hydroxyl, mercapto, ether, thioether, carbonyl, thiocarbonyl, carboxyl ester, amino, imino and amide groups or combinations of same.

As indicated one or more of $R_1$, $R_2$ and $R_3$ may be halogen atoms, chlorine and bromine atoms being preferred. Based on commercial availability, chlorine compounds are preferred over bromine compounds.

Vicinal dinitroalkanes or, for that matter, alkanes with any plurality of nitro functions also function as adhesion promoters in our inventions so long as the number of nitro functionalities is not sifficient to cause the compound to be unstable.

Illustrative of compounds useful in the practice of our invention is nitromethane wherein all R groups of the generalized formula are hydrogen atoms. Monoalkyl derivatives or nitromethane such as nitroethane, 1-nitropropane, 1-nitrobutane and the like illustrate compounds wherein one R group is a straight chain aliphatic group, Additionally, the following compounds, being named as derivatives of methane are useful in our invention: dimethylnitromethane (2-nitropropane in a following example), trimethylnitromethane, diethylnitromethane, triethylnitromethane, di-n-propylnitromethane, tri-n-propylnitromethane and the like.

Examples of aliphatic nitrocompounds containing branched hydrocarbyl groups useful in the invention are 1-nitro-3-methylbutane, and 2,6-dimethyl-4-nitroheptane and the like. Examples wherein the hydrocarbyl group is of a cyclic configuration are cyclohexylnitromethane, bis(cyclohexyl)nitromethane, tris(cyclohexyl)nitromethane, cycloheptylnitromethane and the like.

Illustrations of useful aliphatic nitro compounds wherein the hydrocarbyl group is unsaturated are 3-nitropropene-1,4-nitrobutene-1, 4-nitrobutene-2, 3-nitropentadiene-1,4, 3-nitroheptadiene-2,5, 3-nitroheptadiene-1,6 and the like. Illustrative of aliphatic compounds of the invention in which the hydrocarbyl group is aromatic are phenylnitromethane, bis(-phenyl)nitromethane, tris(phenyl)nitromethane, orthomethylphenyl-nitromethane, bis(orthomethylphenyl)nitromethane, tris(orthomethylphenyl)nitromethane and the like.

Examples of aliphatic halogenated aliphatic nitrocompounds of the invention are chloronitromethane, dichloronitromethane, bromonitromethane, dibromonitromethane, 1-chloro-1-nitroethane, 2-chloro-1-nitroethane, 1-chloro-1-nitropropane, 2-chloro-1-nitropropane, 3-chloro-1-nitropropane, 1-chloro-2-nitropropane, 2-chloro-2-nitropropane and the like.

Illustrative compounds of the invention wherein $R_1$, $R_2$ and $R_3$ are combinations of structures previously referred to are ethyl-iso-propylnitromethane, ethyl-iso-propyl-cyclohexyl-nitromethane, ethyl-cyclohexyl-phenylnitromethane, isopropylcyclohexyl-phenylnitromethane, ethyl-iso-propyl-chloronitromethane, ethyl-iso-propyl-(2-chlorocyclohexyl)nitromethane, ethyl-iso-propyl-(2-chlorophenyl)nitromethane and the like.

Illustrative compounds of the invention with a plurality of nitrofunctions are 1,2-dinitroethane, 1,3-dinitropropane, 1,2-dichloro-1,2-dinitroethane, 1,3-dichloro-1,3-dinitropropane, 2,2-dichloro-1,3-dinitropropane, 1,2,3-trinitropropane, 1,2,3-trichloro-1,2,3-trinitropropane and the like.

ADHESION TESTS

The adhesion test results reported hereafter were obtained on laminates of olefinic rubber and polyurethane rubber, a cement in accordance with the invention having been interposed between the two rubbers. The procedure follows.

First, a sheet 6 inches square and 0.100 inch thick was prepared from a vulcanizable olefinic rubber compound. One side of the olefinic rubber sheet was backed with reinforcing nylon tire fabric treated for adhesion. This sheet was cured (usually of the order of 20 to 30 minutes at about 300°F.). The cured olefinic rubber sheet was buffed to a satiny finish on the side opposite the tire fabric, the buffed surface being washed with acetone or white gasoline. A 2 by 6 inch portion of the buffed surface in a direction perpendicular to the direction of the tire cord of the fabric was covered with holland cloth, the holland cloth being securely taped down on all four edges. The exposed buffed surface of the cured olefinic rubber sheet was then coated with the adhesive cement of the invention being tested and allowed to dry. The olefinic rubber sheet was then placed in the bottom of a 6 by 6 by 0.250 inch mold with the adhesive cement coated surface up. A curable liquid polyurethane rubber compound was poured into the mold in a sufficient quantity to fill the mold. After the polyurethane material had gelled a 6 by 6 inch piece of square woven nylon was placed on the surface of the polyurethane. A cover plate was placed on the top of the mold and the mold was heated 3 hours at 212°F. to complete the curing of the polyurethane rubber. Flashing was trimmed from the resulting test laminate and the edge containing the holland cloth was cut back to expose the cloth. One inch wide test strips were cut from the laminate in a direction parallel to the direction of the reinforcing tire cord. After 24 hours room temperature test results were obtained by clamping the free ends of a given test strip to the jaws of a testing machine and the jaws of the test machine were pulled apart at a rate of 2 inches per minute, the force in pounds per inch at tear as well as the nature of the tear being observed. With regard to the nature of the adhesion, the terms "Pad Tear", "Rubber Tear", "Urethane Tear" and "Adhesive Failure" as they may appear hereafter have the following meanings. "Pad Tear" means that the tear was along the fabric. "Rubber Tear" means that the tear was in the olefinic rubber. "Urethane Tear" means that the tear was in the polyurethane rubber. "Adhesive Failure" means that the tear was along the interface between the polyurethane rubber and the olefinic rubber. Where the percentage of tear reported hereafter is less than 100%, the balance was tear along the interface. For elevated temperature testing the test samples were placed in an oven maintained at the desired elevated temperature at 5 minute intervals. Each test sample was then removed after being in the oven a total of 15 minutes and immediately subjected to the pulling test.

The following examples illustrate practice of the invention. In the examples the vulcanizable olefinic rubber sheets employed were prepared of the following formulation:

|  | Parts by Weight |
| --- | --- |
| SBR | 60.0 |
| Polybutadiene | 40.0 |
| Carbon black | 70.0 |
| Oil | 44.0 |
| Zinc Oxide | 2.0 |
| Stearic acid | 2.0 |
| Wax | 3.0 |
| Sulfur | 1.7 |
| Accelerator | 1.2 |
| Antioxidant | 1.0 |

Following the procedure above outlined, such sheets were backed, cured, buffed and one surface coated by brushing with a cement containing the adhesion promoter of the invention. The adhesive coated sheets were in each instance formed into a laminate by the above-described procedure with a polyurethane rubber composition of the following formulation:

|  | Parts by Weight |
| --- | --- |
| Adiprene L-167* | 100.00 |
| Silicone DC-200** | 0.10 |
| Methylene bis(o-chloro-p-aniline) | 20.98 |
| Dioctyl phthalate | 20.00 |

*A polyurethane rubber supplied by E. I. duPont de Nemours & Co., Inc.
**A silicone oil supplied by Dow Corning Corporation.

EXAMPLE I

A cement containing an adhesion promoter of the invention was prepared of the following formulation:

|  | Grams |
| --- | --- |
| Nitroethane | 0.75 |
| Adiprene L-167 | 1.50 |
| Toluene diisocyanate | 3.00 |

Following the above outlined procedure, adhesion test strips were produced employing this cement to adhere the described olefinic rubber to the described polyurethane rubber. The test results obtained were as follows:

| Test Temperature | Adhesion, lbs./in. | Nature of Adhesion |
| --- | --- | --- |
| Room | 120 | 100% rubber tear |
| 212°F. | 60 | 100% rubber and pad tear |
| 250°F. | 60 | 100% rubber tear |

EXAMPLE II

A cement containing an adhesion promoter of the invention was prepared of the following formulation:

|  | Grams |
| --- | --- |
| 2-Nitropropane | 0.75 |
| Adiprene L-167 | 1.50 |
| Toluene diisocyanate | 3.00 |

Following the above outlined procedure, adhesion test strips were produced employing this cement to adhere the described olefinic rubber to the described polyurethane rubber. The test results obtained were as follows:

| Test Temperature | Adhesion, lbs./in. | Nature of Adhesion |
| --- | --- | --- |
| Room | 78 | 100% rubber tear |
| 212°F. | 20 | 100% rubber tear |
| 250°F. | 35 | 50% rubber tear |

EXAMPLE III

A cement containing an adhesion promoter of the invention was prepared of the following formulation:

| | Grams |
| --- | --- |
| 1-chloro-1-nitropropane | 0.75 |
| Adiprene L-167 | 1.50 |
| Toluene diisocyanate | 3.00 |
| Toluene | 3.00 |

Following the above outlined procedure, adhesion test strips were produced employing this cement to adhere the described olefinic rubber to the described polyurethane rubber. The test results obtained were as follows:

| Test Temperature | Adhesion lbs./in. | Nature of Adhesion |
| --- | --- | --- |
| Room | 120 | 100% urethane tear |
| 212°F. | 50 | 75% rubber tear and 25% pad tear |
| 250°F. | 83 | 100% urethane tear |

EXAMPLE IV

A cement containing an adhesion promoter of the invention was prepared of the following formulation:

| | Grams |
| --- | --- |
| 2-chloro-2-nitropropane | 0.75 |
| Adiprene L-167 | 3.00 |
| Toluene diisocyanate | 1.50 |
| Toluene | 3.00 |

Following the above outlined procedure, adhesion test strips were produced employing this cement to adhere the described olefinic rubber to the described polyurethane rubber. The test results obtained were as follows:

| Test Temperature | Adhesion, lbs./in. | Nature of Adhesion |
| --- | --- | --- |
| Room | 44 | 40% rubber tear |
| 212°F. | 25 | 5% rubber tear |
| 250°F. | 8 | Adhesive failure |

EXAMPLE V

A cement containing an adhesion promoter of the invention was prepared of the following formulation:

| | Grams |
| --- | --- |
| 1,3-dinitroneopentane | 0.75 |
| Adiprene L-167 | 1.50 |
| Toluene diisocyanate | 3.00 |
| Toluene | 3.00 |

Following the above outlined procedure, adhesion test strips were produced employing this cement to adhere the described olefinic rubber to the described polyurethane rubber. The test results obtained were as follows:

| Test Temperature | Adhesion, lbs./in. | Nature of Adhesion |
| --- | --- | --- |
| Room | 70 | 50% rubber tear |
| 212°F. | 25 | 5% rubber tear |
| 250°F. | 17 | 5% rubber tear |

As shown by the results reported in the above examples, excellent adhesion is obtained by the use of cements containing the adhesion promoters of the invention. Such cements without the adhesion promoters of the invention are not effective adhesives.

A polyurethane rubber as stated previously may be based on a polyester or polyether or combination of polyester and polyether. These rubbers or their prepolymers are suitable film formers. Other suitable film formers useful in the practice of the invention are the natural and synthetic elastomers generally including without limitation the olefinic rubbers aforementioned as well as telechelic polymers and olefinic resins and their halogen containing analogs, condensation polymers such as phenol-aldehyde and epoxy resins, polyamides, polyesters, and the like. Further suitable film formers include halogenated waxes.

Although toluene diisocyanate was used to illustrate our invention, other suitable isocyanates include phenylisocyanate, tolylisocyanate, xylene diisocyanate, cumene diisocyanate, methylenebis(p,p'-phenylisocyanate), methylenebis(p,p'-tolylisocyanate), methylenebis(p,p'-xylylisocyanate) and the like. Triisocyanates or higher will also function but are generally more expensive and less readily available on a commercial scale. Toluene diisocyanate is preferred on the basis of commercial availability. So-called blocked isocyanates which release the isocyanate at specified temperatures will also function provided that the release temperature is lower than the cure temperature of the composite. Representative blocked isocyanates are phenol blocked, caprolactam blocked isocyanates. Dimeric isocyanates are also applicable. Organic isothiocyanates such as phenylisothiocyanate are also applicable. Another criterion for selection of an isocyanate is whether it would have a tendency to discolor the substrate. For example, Hylene W* is essentially non-staining and would be preferred on this basis.

*Methylenebis(4,4'-cyclohexylisocyanate) supplied by E. I. duPont de Nemours and Co., Inc.

Although toluene is used above as a solvent as a matter of convenience, benzene, xylenes, tetrahydrofuran, dimethylylformamide or many other common organic solvents as well as toluene are suitable. Any aprotoic solvent should be effective. In the case the adhesion promoter is liquid, the solvent may be deleted.

The exact concentrations of the film former, adhesion promoter and isocyanate will depend on the strength of the adhesive bond desired in the final product. Generally, concentrations are selected to obtain optimum adhesion desired for a specific application. In addition, the concentrations are also adjusted to obtain a correct viscosity; that is, if the formulation is to be sprayed, the viscosity should be low, if brushed or dipped an intermediate viscosity would be desired. If the adhesive is to be troweled onto the surface, a higher viscosity is desired. As a guide, suitable concentrations of film former, adhesion promoter and isocyanate on a solvent-free basis normally fall within the following ranges:

|  | Parts by Weight |
|---|---|
| Film Former | 1 – 90 |
| Adhesion Promoter | 1.00 – 60 |
| Isocyanate | 1.00 – 95 |

The data supplied in the Examples demonstrates the utility of the adhesion promoters of the invention for adhering of rubber to polyurethane. The data are indicative that the adhesive formulations give good results with rubber to rubber and urethane to urethane. A particularly desirable application of the adhesives of the invention involves the adhesion of olefinic rubber tire treads to polyurethane rubber tire bodies and conversely in adhering polyurethane rubber tire treads to olefinic rubber tire bodies. Since good adhesion results are obtained using a polyurethane film former based on either a polyether or a polyester, good adhesion of either an olefinic rubber or a polyurethane rubber to polyesters also is obtained by the adhesives of the invention.

A further application of the invention involves treatment of rubber articles with the adhesive formulations of the invention as a means of priming the surface for painting with a urethane based paint or with an acrylate based paint.

Generally, we believe that the adhesive formulations as herein disclosed would be effective for adhering olefinic rubber to thermoplastic or thermosetting resins such as polystyrene, polyalphamethylstyrene, polyvinylchloride, polyvinylidenechloride, polyacrylates, polymethacrylates, polyacrylonitrile, polyesters, polyamides, etc. The adhesive formulations should also be effective for adhering these thermoplastic or thermosetting resins to themselves or to any member of the above-mentioned groups. The adhesive formulations as herein disclosed would also be effective for adhering olefinic rubbers or polyurethane rubbers to themselves or to metals, glass, ceramics, soft and hard woods as well as adhering together any combination of the preceding substrates.

What is claimed is:

1. An adhesively-bonded laminate, layers of said laminate being bonded together by an adhesive composition comprising an organic isocyanate, an organic film-forming material and as an adhesion promoter an aliphatic nitro compound of the formula:

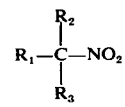

wherein $R_1$, $R_2$ and $R_3$ are selected from the group consisting of hydrogen atoms, hydrocarbyl groups and halogen atoms.

2. An adhesively-bonded laminate in accordance with claim 1 wherein olefinic rubber is bonded to polyurethane rubber.

3. An adhesively-bonded laminate in accordance with claim 1 wherein olefinic rubber is bonded to olefinic rubber.

4. An adhesively-bonded laminate in accordance with claim 1 wherein polyurethane rubber is bonded to polyurethane rubber.

5. An adhesively-bonded laminate in accordance with claim 1 wherein olefinic rubber is bonded to polyester.

* * * * *